(12) United States Patent
Choi et al.

(10) Patent No.: US 11,999,354 B2
(45) Date of Patent: Jun. 4, 2024

(54) METHOD AND APPARATUS FOR ESTIMATION ROAD SURFACE TYPE USING ULTRASONIC SIGNAL

(71) Applicant: Korea Advanced Institute of Science and Technology, Daejeon (KR)

(72) Inventors: Sei-Bum Choi, Daejeon (KR);
Min-Hyun Kim, Daejeon (KR);
Jin-Rak Park, Daejeon (KR);
Seung-In Shin, Daejeon (KR);
Jong-Chan Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 766 days.

(21) Appl. No.: 17/186,329

(22) Filed: Feb. 26, 2021

(65) Prior Publication Data
US 2021/0182632 A1 Jun. 17, 2021

Related U.S. Application Data

(63) Continuation of application No. PCT/KR2019/010993, filed on Aug. 28, 2019.

(30) Foreign Application Priority Data

Aug. 29, 2018 (KR) .......................... 10-2018-0102204

(51) Int. Cl.
*B60W 40/06* (2012.01)
*B60W 40/068* (2012.01)
(Continued)

(52) U.S. Cl.
CPC .......... *B60W 40/068* (2013.01); *G01S 15/88* (2013.01); *G06F 18/213* (2023.01);
(Continued)

(58) Field of Classification Search
CPC .... B60W 40/06; B60W 2552/05; G06V 10/82
See application file for complete search history.

(56) References Cited

U.S. PATENT DOCUMENTS

| | | | |
|---|---|---|---|
| 9,739,881 B1 * | 8/2017 | Pavek | G01S 13/865 |
| 2009/0092284 A1 * | 4/2009 | Breed | B60R 21/0153 |
| | | | 382/103 |

(Continued)

FOREIGN PATENT DOCUMENTS

KR  10-2013-0062034  6/2013

*Primary Examiner* — Long T Tran
(74) *Attorney, Agent, or Firm* — LEX IP MEISTER, PLLC

(57) ABSTRACT

The present invention relates to a method and apparatus for estimating a road surface type by using an ultrasonic signal and, more particularly, to a method for estimating a road surface type by using an artificial neural network model machine-learned with respect to a reflected ultrasonic signal and an apparatus for performing same. According to the present invention, provided are a method and apparatus for providing highly accurate road surface information at low cost, by machine-learning both characteristics of an ultrasonic signal reflected from a road surface and a road surface state, establishing a model between the two, and then estimating the type of the road surface by utilizing the model. In particular, even a road surface where thin ice, that is, black ice, is formed, which was not detectable in the conventional method for estimating a road-surface friction coefficient, may be accurately estimated, thereby contributing to safer driving.

15 Claims, 10 Drawing Sheets

(51) Int. Cl.
   *G01S 15/88*     (2006.01)
   *G06F 18/213*    (2023.01)
   *G06F 18/2415*   (2023.01)
   *G06V 10/82*     (2022.01)
   *G06V 20/56*     (2022.01)

(52) U.S. Cl.
   CPC .......... *G06F 18/2415* (2023.01); *G06V 10/82* (2022.01); *G06V 20/56* (2022.01)

(56) References Cited

U.S. PATENT DOCUMENTS

| | | | |
|---|---|---|---|
| 2016/0178802 A1* | 6/2016 | Stainvas Olshansky | ................... G01S 17/95 356/445 |
| 2017/0371348 A1 | 12/2017 | Mou | |
| 2019/0258251 A1* | 8/2019 | Ditty | ...................... G06V 20/58 |
| 2020/0026960 A1* | 1/2020 | Park | ........................ G06F 18/23 |
| 2020/0309533 A1* | 10/2020 | Young | .................. G06V 10/993 |

\* cited by examiner

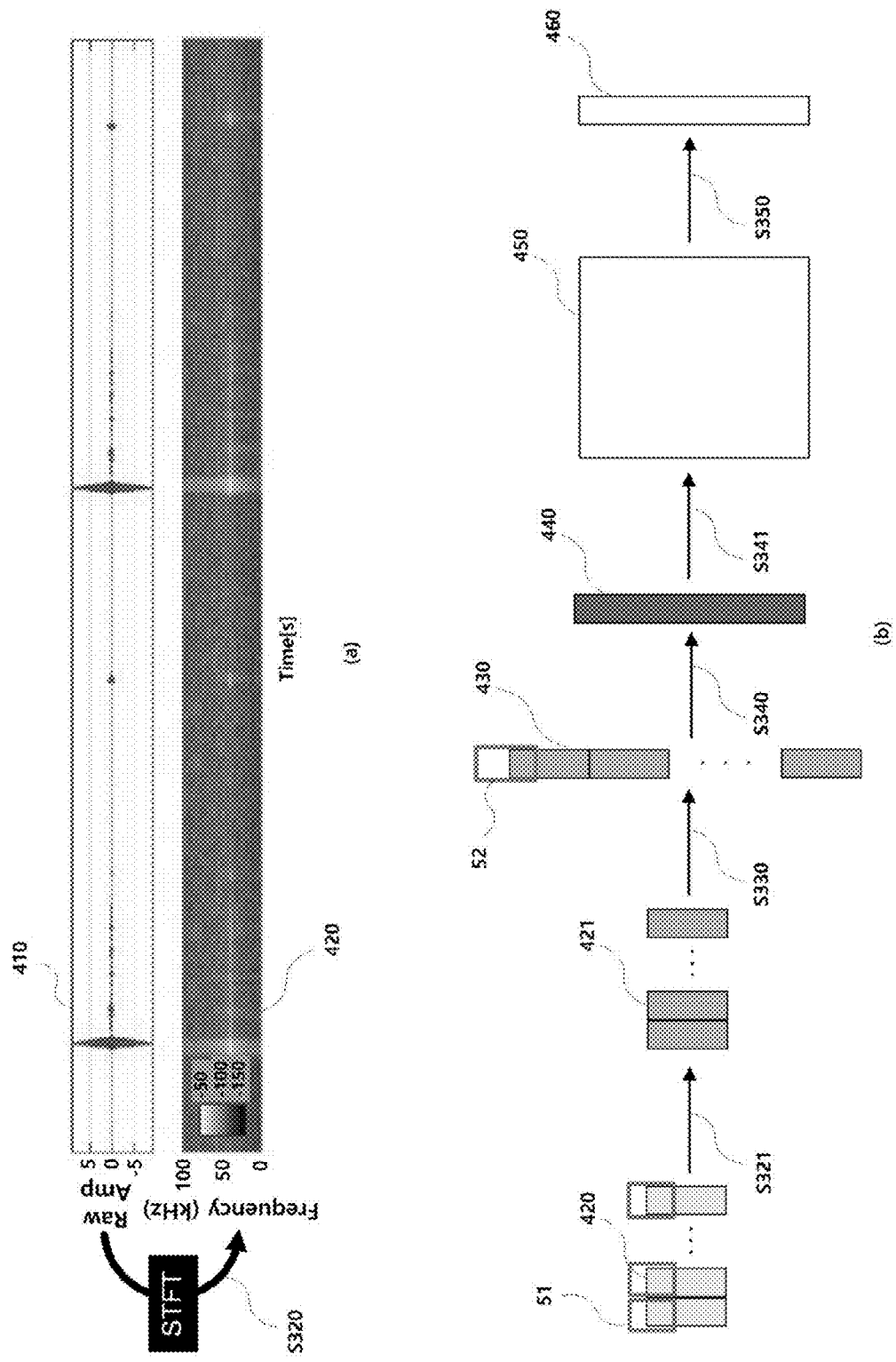

| Layer | Configuration |
|---|---|
| Conv1 | Conv1d(201, stride=5) |
| Conv2 | Conv1d(201, stride=5) |
| Conv3 | Conv1d(201, stride=5) |
| Conv4 | Conv1d(201, stride=5) |
| Conv5 | Conv1d(201, stride=5) |
| FC6 | Linear(feature_size,512) |
| FC7 | Linear(512,256) |
| FC8 | Linear(256,8) |
| Output | Probability calculation for each output |

FIG. 5C

| 1 | -1 | -1 |
|---|----|----|
| -1 | 1 | -1 |
| -1 | -1 | 1 |

FIG. 6

| Confusion matrix | | Estimation | | | | | | | STFT Window Size = 5000 |
|---|---|---|---|---|---|---|---|---|---|
| | | asphalt | cement | dirt | ice | marble | paint | snow | water |
| Ground Truth | asphalt | 339 | | | | | | | |
| | cement | | 189 | | | | | | |
| | dirt | | | 272 | | | | | |
| | ice | | | | 135 | | | | |
| | marble | | | | | 91 | | | |
| | paint | 2 | | | | | 91 | | |
| | snow | | | | | | | 90 | |
| | water | | | | | | | | 182 |

FIG. 11

| Accuracy | asphalt | cement | dirt | ice | paint | snow | water | marble | Total |
|---|---|---|---|---|---|---|---|---|---|
| 1M Samples/sec | 99.7 | 99.5 | 100 | 100 | 97.9 | 100 | 100 | 100 | 99.7 |
| 40K Samples/sec | 99.7 | 100 | 99.3 | 99.3 | 100 | 100 | 98.9 | 100 | 99.6 |
| 20K Samples/sec | 99.7 | 98.4 | 98.9 | 100 | 100 | 100 | 98.9 | 100 | 99.4 |

METHOD AND APPARATUS FOR ESTIMATION ROAD SURFACE TYPE USING ULTRASONIC SIGNAL

BACKGROUND OF THE INVENTION

1. Field of the Invention

The present invention relates to a method and an apparatus for estimating a road surface type using an ultrasonic signal, more specifically, to a method for estimating the type of a road surface using a machine-learning artificial neural network model for a reflected ultrasonic signal, and an apparatus for performing the same.

2. Description of the Related Art

Unlike ordinary ground, it becomes difficult for a person to increase or decrease walking speed when walking on slippery ice. As with ground vehicles, it is very important to know the maximum frictional force of the road surface in motion control. Since the road surface friction coefficient determines how much acceleration/deceleration can be performed in the longitudinal and transverse motion, it becomes a very important factor in both the stability control aspect and the maximum motion performance control aspect of the ground vehicle.

In a vehicle, if the maximum coefficient of friction between the tire and the road surface is known, the maximum vertical and lateral force that the vehicle can exert can be determined in advance. Therefore, it is possible to prevent the tire from being locked, to prevent accidents caused by inability to steer, or to bring out the maximum moving performance of the vehicle. Therefore, one can drive the vehicle more safely and sporty.

In order to estimate the coefficient of friction, the following method has been conventionally adopted:

1) Estimation of maximum friction coefficient between tire and road surface through vehicle kinematic measurement FIG. 1A is a graph showing the relationship between the tire slip amount according to the road surface and the longitudinal and lateral forces of the tire, and FIG. 1B is a graph showing the experimental data of the relationship between the tire slip amount according to the road surface and the normalized tire longitudinal load.

The maximum coefficient of friction between tire and road surface can be estimated through vehicle kinematic measurement. In this method, the longitudinal and lateral force applied to the tire and the amount of tire slip are calculated using the wheel angular velocity sensor, the vehicle acceleration sensor, and the vehicle angular velocity change rate sensor. And the tire slip amount, that is, the tire longitudinal and lateral force relationship data, is obtained as shown in FIGS. 1A and 1B. After that, in the section where the slip amount is small, the slip amount-tire longitudinal and lateral force slope is calculated, and the maximum point of the tire longitudinal and lateral force in the total tire slip amount is predicted. If one can find the maximum point of the tire longitudinal and lateral force and divide it by the tire load, this is the maximum coefficient of friction between the tire and the road surface. However, in this method, the longitudinal and lateral force of the tire are not accurate in the section where the tire slip amount is small, due to noise included in sensors such as wheel speed sensor, vehicle acceleration sensor, vehicle angular velocity change rate sensor, and also due to change in tire vertical load because of vehicle load change and change in center of gravity because of vehicle movement. Accordingly, the slope between the amount of slip and the longitudinal and lateral forces of the tires obtained using inaccurate data becomes also inaccurate, and the maximum friction coefficient between tire and road surfaces using the maximum point of the longitudinal and lateral forces of the tire on the extension line is also inaccurate. That is, it is used only limited case because it requires estimation for estimation.

2) Check the road surface condition using camera and estimate the maximum friction coefficient between tire and road surface:

This is a method of estimating the road surface friction coefficient by checking road conditions such as dry asphalt, wet asphalt, and snowy roads using image information from the camera. This allows the maximum friction coefficient between tire road surfaces to be estimated by mapping the maximum road surface friction coefficient to the corresponding road surface conditions. However, this method not only requires an expensive camera sensor module, but also requires a high-performance signal processing device. In addition, if there is another object on the road surface, the probability of misrecognition increases. And the probability that the road surface is incorrectly estimated is very high according to the surrounding illumination.

SUMMARY OF THE INVENTION

The present invention was invented to solve the above-mentioned problem and has a purpose to provide a method and apparatus for providing highly accurate road surface information at low cost by establishing a model between the characteristics of the ultrasonic signal reflected from the road surface and the road surface condition through machine learning and estimating the type of the road surface using the same.

According to an aspect of the present invention, a method for estimation road surface type using an ultrasonic signal, comprising: (a) extracting a 1D feature vector through one or more 1D convolutional layers using an input signal derived from a reflection signal in the time domain of the ultrasonic signal reflected from the road surface after being emitted to the road surface; (b) receiving the 1D feature vector as an input and estimating a probability value for each road surface type in an artificial neural network having one or more layers; and, (c) determining the road surface type from the estimated probability value for each road surface type is provided.

According to other aspect of the present invention, an apparatus for estimation road surface type using an ultrasonic signal, comprising: at least one processor; and, at least one memory storing computer-executable instructions, wherein the computer-executable instructions stored in said at least one memory, when executed by the at least one processor, causes the at least one processor to perform operations comprising: (a) extracting a 1D feature vector through one or more 1D convolutional layers using an input signal derived from a reflection signal in the time domain of the ultrasonic signal reflected from the road surface after being emitted to the road surface; (b) receiving the 1D feature vector as an input and estimating a probability value for each road surface type in an artificial neural network having one or more layers; and, (c) determining the road surface type from the estimated probability value for each road surface type is provided.

According to another aspect of the present invention, an apparatus for estimation road surface type using an ultrasonic signal, comprising: at least one processor; a memory for storing a convolution filter for convolution operation; a feature extractor for extracting a 1D feature vector through one or more 1D convolutional layers using an input signal derived from a reflection signal in the time domain of the ultrasonic signal reflected from the road surface after being emitted to the road surface; and a classifier that receives the 1D feature vector as an input and estimates a probability value for each road surface type in an artificial neural network having one or more layers is provided.

According to the present invention, a method and apparatus for providing highly accurate road surface information at low cost by establishing a model between the characteristics of the ultrasonic signal reflected from the road surface and the road surface condition through machine learning and estimating the type of the road surface using the same are provided. In particular, the present invention contributes more safe driving by accurately detecting even road surface with thin ice (i.e., black ice), which was not possible in the conventional road surface friction coefficient estimation method.

BRIEF DESCRIPTION OF THE DRAWINGS

FIG. 4 is a schematic diagram showing each process of the first embodiment of FIG. 3.

FIG. 5C is an exemplary convolution filter for being used in the convolution operation in FIG. 5B.

FIG. 6 shows a test result of the first embodiment of FIG. 3.

FIG. 11 shows a road surface type estimation test result at each different sampling frequencies of an ultrasonic sensor system.

DETAILED DESCRIPTION OF THE INVENTION

Figure 1A:
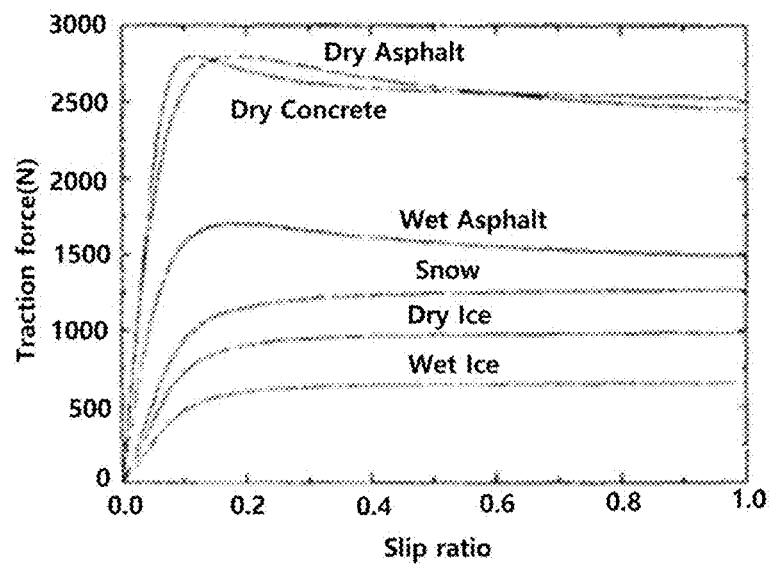
FIGS. 1A and 1B are graphs showing the relationship between the amount of tire slip and the longitudinal and lateral tire force according to the road surface.
Figure 1B:
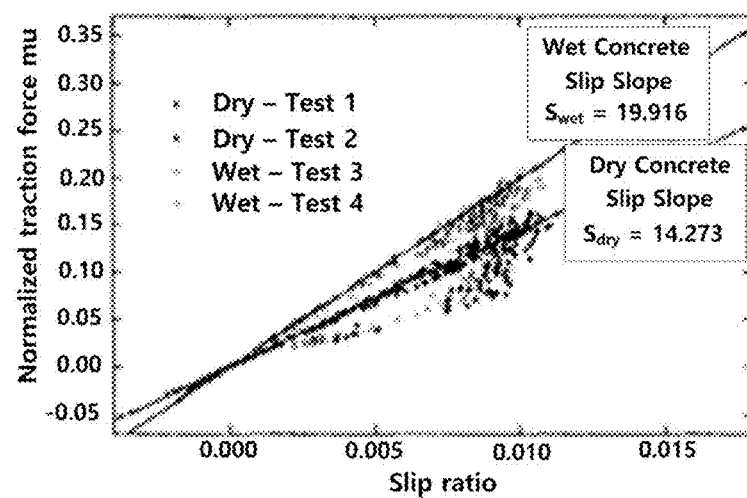

Hereinafter, exemplary embodiments of the present invention will be described in detail with reference to the accompanying drawings. Terms or words used in the specification and claims should not be construed as being limited to their usual or dictionary meanings and, based on the principle that the inventor can appropriately define the concept of terms in order to describe his own invention in the best way, it should be interpreted as a meaning and concept consistent with the technical idea of the present invention. Accordingly, the embodiments described in the present specification and the configurations shown in the drawings are only the most preferred embodiment of the present invention, and do not represent all the technical spirit of the present invention. It should be understood that there may be various equivalents and modifications that may be substituted for them at the time of application.

Figure 2:
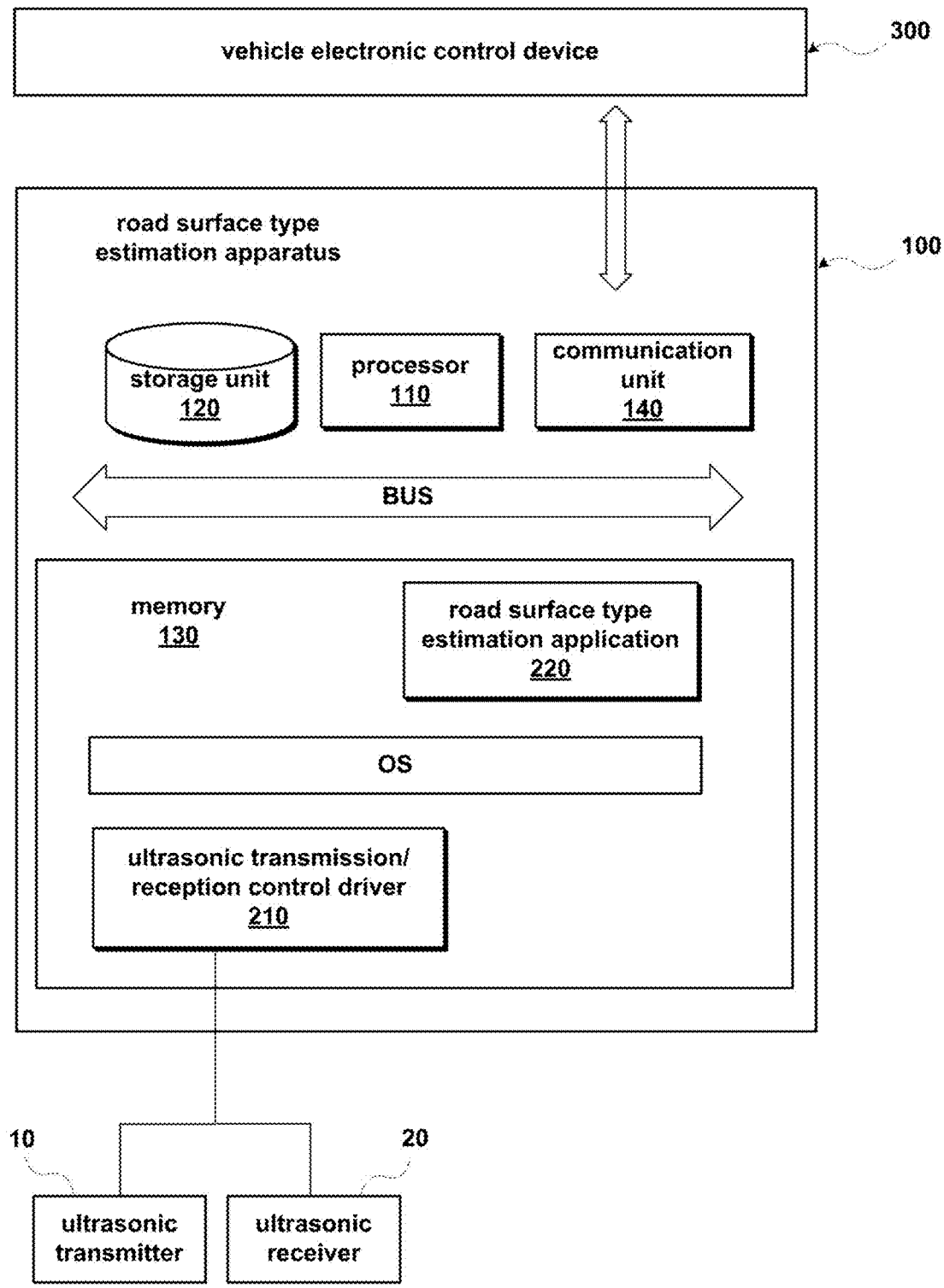
FIG. 2 shows the configuration of a computer device equipped with an application for estimating a road surface using an ultrasonic signal according to the present invention.

FIG. 2 shows the configuration of a computer device in which an application for estimating a road surface type using an ultrasonic signal according to the present invention is installed.

The road surface type estimation apparatus 100 includes a processor 110, a nonvolatile storage unit 120 storing programs and data, a volatile memory 130 storing running programs, a communication unit 140 for performing communication with other devices, and a bus that is an internal communication path between these units. As a running program, there may be a device driver, an operating system, and various applications. Although not shown, a power supply unit such as a battery may also be included.

The road surface type estimation system using ultrasonic signals further includes the ultrasonic transmitter 10 and the ultrasonic receiver 20 together with the road surface type estimation apparatus 100 using ultrasonic signals.

In a road surface type estimation system using an ultrasonic signal mounted on a mobile object moving on the ground, for example, a vehicle, the ultrasonic transmitter 10 emits ultrasonic waves toward the road surface, and the ultrasonic waves reflected from the road surface is received by the ultrasonic receiver 20. The ultrasonic receiver 20 transmits the reflection signal to the road surface type estimation application 220. In this way, the road surface type estimation application 220 receives the reflection signal regarding the ultrasonic wave reflected from the road surface from the ultrasonic receiver 20. When the ultrasonic receiver 20 continuously transmits the reflection signal, the road surface type estimation device 100 properly transmits the reflection signal to the road surface type estimation application 220 via a data interface device (not shown). The data interface device may serve as a kind of buffer in the process of transmitting the reflection signal to the road surface type estimation application 220. In addition, an ultrasonic transmission/reception control driver 210 may be installed in the road surface type estimation apparatus 100, and may serve to control the operation of the ultrasonic transmitter 10 and the ultrasonic receiver 20 as described above. Furthermore, the ultrasonic transmission/reception control driver 210 is connected to the vehicle electronic control device 300 through the communication unit 140. The vehicle electronic control device 300 may control the operation of the ultrasonic transmitter 10 and the ultrasonic receiver 20.

When the ultrasonic sensor system including the ultrasonic transmitter 10 and the ultrasonic receiver 20 is mounted on a vehicle and used for detecting the condition of the road surface, the ultrasonic sensor system has a wide field view in order to detect the condition of the entire road surface.

However, if necessary, an ultrasonic sensor system having a small field view may be also used. In the vehicle, as an embodiment, each ultrasonic sensor system having a small field view may be separately mounted on the left and right sides, and each of the ultrasonic sensor systems may be used to detect the conditions of the road surfaces on the left side and the right side based on the center line of the vehicle.

In addition, when such ultrasonic sensor system having a small field view is installed on the left and right sides of the vehicle, it can be used especially for detecting lanes on the road. For example, when a driving vehicle happens to cross a lane to the left or right due to the driver's drowsy driving etc., a warning may be given to the driver by detecting that the left or right lane has entered in a certain range.

The road surface type estimation application 220 performs a role of estimating the road surface type by using the ultrasonic signal as described above. Such a road surface type estimation application 220 is a program installed and operated in the road surface type estimation apparatus 100. It will be described hereinafter in detail with reference to FIGS. 3 to 9.

Figure 3:
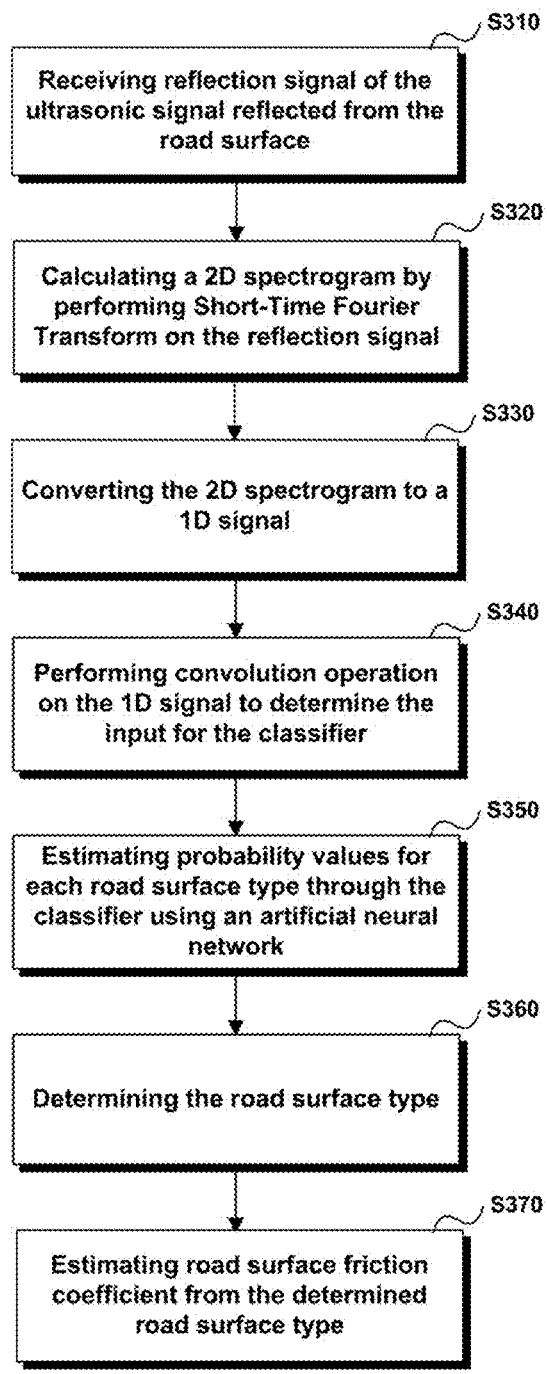
FIG. 3 shows a flow chart of a first embodiment of the present invention for estimating a road surface type using an ultrasonic signal.

FIG. 3 is a flow chart illustrating the first embodiment of the present invention for estimating a road surface type using an ultrasonic signal and FIG. 4 is a schematic diagram showing each process of the first embodiment.

FIG. 3 illustrates a process performed by the operation of the road surface type estimation application 220 of FIG. 2. First, a reflection signal is received from the ultrasonic receiver 20 (S310). The received reflection signal 410 (refer to FIG. 4) is a signal representing the intensity of the reflected ultrasonic wave over time.

From the signal extracted from the reflection signal in the time domain, a 1D feature vector per time is extracted through an 1D convolution layer, and an input to be entered into a classifier is determined (S340). By moving a window having a predetermined time interval on the received (S310) reflection signal 410 and performing a Fourier Transform (Short-Time Fourier Transform), a signal in the time-frequency domain, i.e., 2D spectrogram 420 (refer to FIG. 4) is calculated (S320). The calculated 2D spectrogram 420 is converted into a 1D signal 430 for each time (refer to FIG. 4) (S330), and then convolution is performed (S340). If necessary, before converting the calculated 2D spectrogram 420 into a time-based 1D signal 430, convolution may be first performed by the convolution filter 51 (S321, see FIG. 4).

Convolution may be performed through one or more convolutional layers (S340). As described above, the 1D feature vector 440 (refer to FIG. 4) calculated through the one or more convolutional layers is determined as an input of the classifier (S340).

The classifier 450 (refer to FIG. 4) is an artificial neural network having multi-layers. The classifier 450 using such an artificial neural network is determined as a final classifier model by learning a weight value using training data in an artificial neural network having the same layer configuration. Here, the weight means the weight of the connection value of one or more layers of the artificial neural network.

The one or more convolutional layers (S340) for calculating the 1D feature vector for the classifier 450 and the classifier 450 having a multi-layer artificial neural network forms together a convolutional neural network (CNN). The aforementioned weight may mean a weight of a connection value of one or more layers of the artificial neural network 450 or values of a convolution filter 52 in the one or more convolutional layers. The weight of the connection value of one or more layers of the artificial neural network can be determined through machine learning and also the value of the convolution filter 52 in the one or more convolutional layers can be determined through machine learning. The training data is input to the artificial neural network, and the gradient descent method is used for optimization in the direction of minimizing the loss between the output value and the actual correct answer.

The convolutional artificial neural network (CNN) model is determined by the weight or convolutional layer filter value which is determined by training and estimates a probability value 460 (refer to FIG. 4) for each type of road surface from which the ultrasonic wave is reflected (S350). The type of the road surface can be determined as the type having the largest probability value (S360). Furthermore, the friction coefficient of the corresponding road surface may be estimated from the determined road surface type (S370). Such a convolutional artificial neural network (CNN) model is included in the road surface type estimation application 220.

As described above with reference to FIG. 2, when the ultrasonic sensor system including the ultrasonic transmitter 10 and the ultrasonic receiver 20 is mounted on a vehicle and used for detecting the condition of the road surface, such an ultrasonic sensor system may be used to detect the state of the entire road surface by having a wide field view. An ultrasonic sensor system having a small field view that detects the condition of a part of the road surface may also be used.

When an ultrasonic sensor system having a wide field view is mounted on a vehicle, the type of the road surface currently on which the vehicle is moving may be determined by using the state of the road surface detected by the ultrasonic sensor system (S360).

When an ultrasonic sensor system having a small field view is mounted, each ultrasonic sensor system may be separately mounted on the left and right sides of the vehicle. Using the road surface type detected by each ultrasonic sensor system, the road surface type of the left side and the right side may be classified and determined (S360).

In addition, when the ultrasonic sensor system having such a small field view is installed on the left and right sides of the vehicle, it can be particularly used for detecting a lane applied on a road. That is, the type of the road surface detected by the ultrasonic sensor system may be determined as the lane (S360). As shown in FIG. 2, for example, when a driving vehicle is likely to cross a lane to the left or right due to a driver's drowsy driving etc., it may be used to give a warning to the driver by detecting that the left or right lane has entered in a certain range.

Figures 5A, 5B:
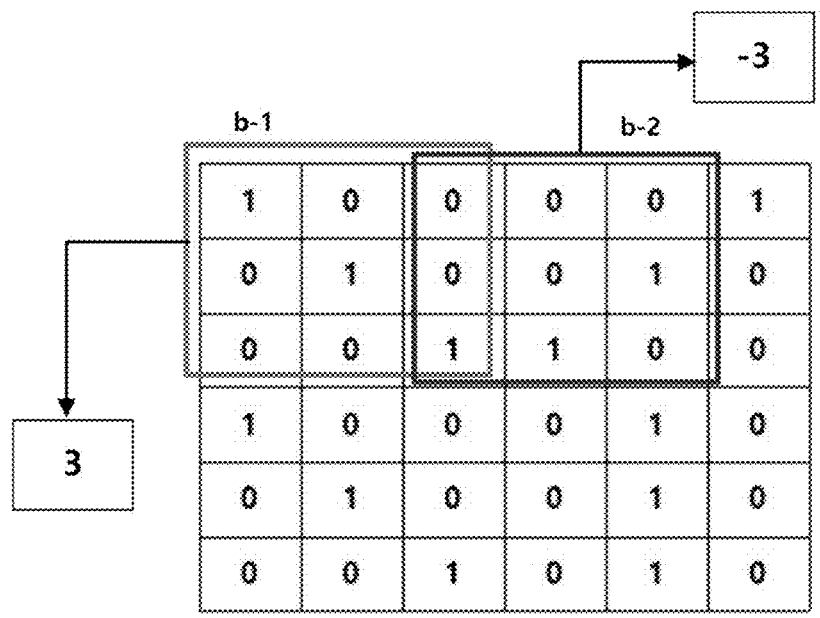
FIG. 5A shows an embodiment of the present invention in which the convolutional layer includes five layers (Conv1 to Conv5), and the classifier includes three layers (FC6 to FC8).
FIG. 5B shows an exemplary convolution operation performed on 6×6 data.

FIG. 5A shows an embodiment in which a convolutional layer includes five layers (Conv1 to Conv5), and a classifier includes three layers (FC6 to FC8). For example, in Conv1, '201' means the size of the convolutional layer, and the stride value means the size at which the convolutional filter jumps.

FIGS. 5B and 5C are examples for explaining the execution of convolution. In FIG. 5B, convolution is performed on 6×6 data 5B using the convolution filter of FIG. 5C. First, the first data b-1 of FIG. 5B is dot-producted by the convolution filter (FIG. 5C) to obtain a value of three (3). The window moves 2 spaces (stride=2) to obtain data b-2. Data b-2 is dot-producted with the convolution filter (FIG. 5C) and a value of −3 is obtained. When the convolution operation is performed for all data, the number of data is significantly reduced and a new data representing the characteristics of the original data is calculated.

Although not shown, among the above-described convolutional layers, a max pooling layer may be included. Max pooling does not reduce data in the way shown in FIG. 5B, but reduces data by selecting the largest value of 3×3 data b-1. One or more convolutional layers and one or more max pooling layers may be included. In the specification of the present application, the "convolutional layer" includes not only one or more convolutional layers but also one or more max pooling layers.

FIG. 6 is a test result of the first embodiment of the present invention shown in FIG. 3.

In this test, training and test were performed with a 4624 DB set for 20 minutes, with the convolutional layer and the classifier layer configured as shown in FIG. 5A. Of the 4624 DB sets, training was performed for 3233 DB sets to determine weights and filter values to form a convolutional neural network model, and test were performed with the remaining 1391 DB sets.

The number on the diagonal indicates cases where the actual road surface type (Ground Truth) and the road surface type estimated through the convolutional neural network (CNN) of the present invention (Estimation) coincide, that is, the number of times accurate estimation has been made. According to the results shown in FIG. 6, the number of incorrect estimates is only two times when the painted road surface is incorrectly estimated as asphalt.

As described above, when the ultrasonic sensor system having a small field view is installed on the left and right sides of the vehicle, in particular, it can be used for detecting the lane applied on the road. In this case, although not shown in FIG. 6, 'Lane' may be further included among the road surface type.

Figure 7:
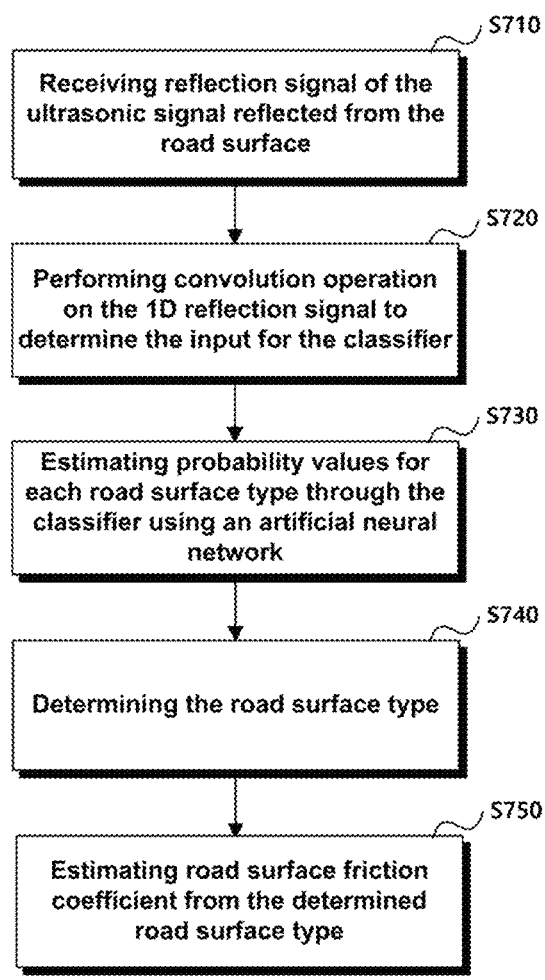
FIG. 7 is a flow chart a second embodiment of the present invention for estimating a road surface type using an ultrasonic signal.
Figure 8:
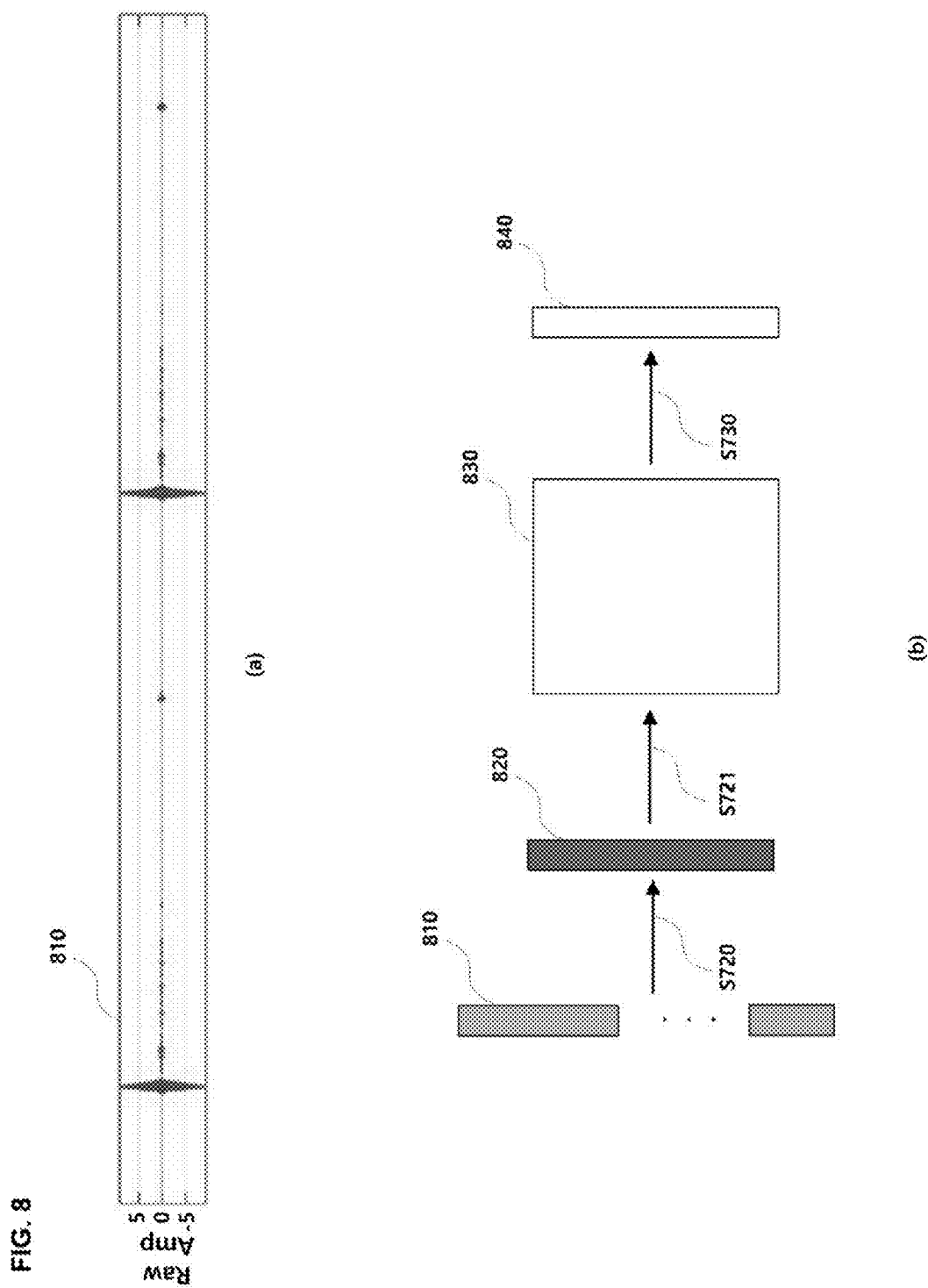
FIG. 8 is a schematic diagram showing each process of the second embodiment of FIG. 7.

FIG. 7 is a flowchart illustrating a second embodiment of the present invention, and FIG. 8 is a schematic diagram illustrating each process of the second embodiment shown in FIG. 7.

FIG. 7 is a diagram showing a process performed by the operation of the road surface type estimation application 220 of FIG. 2 as the second embodiment. First, a reflection signal is transmitted from the ultrasonic receiver 20 (S710). The received ultrasonic reflection signal 810 (refer to FIG. 8) is a signal representing the intensity of the reflected ultrasonic wave with respect to time.

Unlike the first embodiment of FIG. 3, Short-Time Fourier Transform (STFT) is not performed on the reflection signal in the time domain. The road surface type is estimated by using the reflection signal in the time domain as an input to the convolutional neural network.

As in the case of FIG. 3, convolution may be performed through one or more convolutional layers (S720). The 1D feature vector 820 (refer to FIG. 8), which is calculated through the one or more convolutional layers, is determined as an input of the classifier (S721, see FIG. 8).

The classifier 830 (refer to FIG. 8) is also formed as an artificial neural network includes multi-layers, as described above with reference to FIGS. 3 and 4. The classifier 830 using such an artificial neural network is determined as a final classifier model by learning a weight value using training data in an artificial neural network having the same model architecture.

As described above with reference to FIGS. 3 and 4, the convolutional layer (S720) that calculates the 1D feature vector and the classifier 830 are combined to be a convolutional neural network (CNN). The above-described weight may mean a connection value of one or more layers of the artificial neural network 830 or a value of a convolution filter in a convolutional layer. This means that not only the connection value of one or more layers of the artificial neural network can be determined through machine learning, but also the convolutional filter value in the convolutional layer can be determined through machine learning. The training data is input to the artificial neural network, and optimization is performed in a gradient descent method in the direction of minimizing the loss between the output value and the actual correct answer.

A convolutional artificial neural network (CNN) model is determined based on the weight of the artificial neural network and the convolutional layer filter value which were determined by learning. The convolutional artificial neural network (CNN) model estimates a probability value 840 (refer to FIG. 8) for each road surface type (S730). From the road surface type having the largest probability value, the type of the corresponding road surface can be determined (S740). The friction coefficient of the corresponding road surface may also be estimated from the determined road surface type (S750). Such a convolutional neural network (CNN) model is included in the road surface type estimation application 220.

As described above with reference to FIG. 2, when an ultrasonic sensor system including an ultrasonic transmitter 10 and an ultrasonic receiver 20 is mounted on a vehicle and used for detecting the condition of the road surface, an ultrasonic sensor system having a wide field view can be used to detect the condition of the entire surface. If necessary, an ultrasonic sensor system with a small field view may be used to detect the condition of a part of the road surface. In each cases, the embodiment of estimating the road surface type (S740) is the same as the embodiment in FIG. 3 described with respect to the road surface type estimation (S360).

Figures 9, 10:
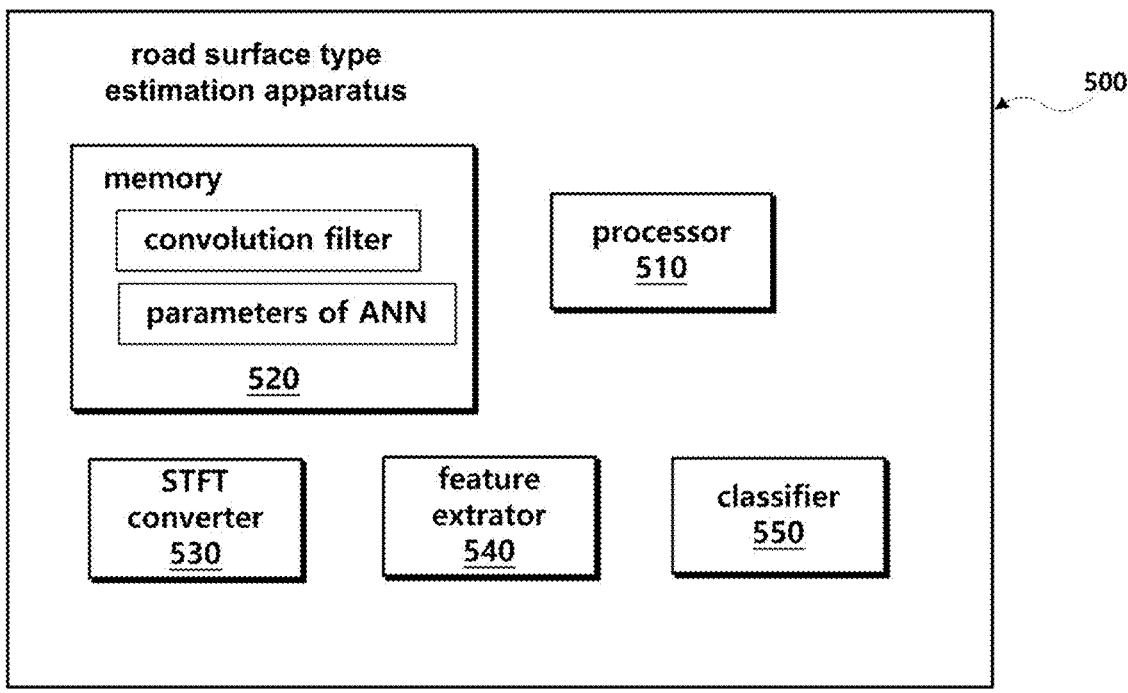
FIG. 9 shows a test result of the second embodiment of FIG. 7.
FIG. 10 shows another configuration of a road surface type estimation apparatus for estimating a road surface using an ultrasonic signal according to the present invention.

FIG. 9 is a test result of the second embodiment shown in FIG. 7.

Training and test were performed using reflection signal in the time domain as an input to the convolutional neural network without performing a Short-Time Fourier Transform (STFT). The convolutional layer and the classifier layer are configured as shown in FIG. 5A. Training and test were performed on the 4977 DB set. Among 4977 DB sets, 3484 DB sets were used to determine weights, filter values etc., by performing machine learning to form a convolutional neural network (CNN) model. Test was performed with the remaining 1493 DB sets.

The number on the diagonal indicates cases where the actual road surface type (Ground Truth) and the road surface type estimated through the convolutional neural network (CNN) of the present invention (Estimation) coincide, that is, the number of times accurate estimation has been made. According to the results of FIG. 9, the painted road surface was incorrectly estimated as asphalt or cement road surface, and the cement road surface was incorrectly estimated as a dirt road surface. From these results, it can be seen that there is no significant differences in road surface estimation accuracy from the case of applying CNN after performing Short-Time Fourier Transform (STFT) on the reflection signal in the time domain.

Meanwhile, when an ultrasonic sensor system having a small field view is installed on the left and right sides of the vehicle, respectively, it can be particularly used for detecting lanes applied on the road. In this case, although not shown in FIG. 9, the detection 'Lane' may be further included in the road surface type to be detected.

FIG. 10 shows the configuration of a road surface type estimation apparatus 500 using an ultrasonic signal according to the present invention.

In the road surface type estimation apparatus 100 according to the present invention of FIG. 2, the estimation of the road surface type is performed by the operation of the road surface type estimation application 220. In FIG. 10, each step is operated in hardware.

In FIG. 2, operations of the STFT converter 530, feature extractor 540, and classifier 550 of FIG. 10 are performed by the operation of the road surface type estimation application 220. In the case of FIG. 10, each of these modules is configured in hardware by using an electronic circuit on a chip. In such hardware configuration, a road surface estimation process by a convolutional neural network (CNN) is performed faster. The feature extractor 540 and the classifier 550 may be configured as separate chips. Or both the feature extractor 540 and the classifier 550 may be included in one chip. In addition, the reflection signal in the time domain may be directly used as an input of the feature extractor 540 without performing Short-Time Fourier Transform (STFT). In this case, the STFT converter 530 is not required.

The road surface type estimation apparatus 500 of FIG. 10 includes at least one processor 130, a memory 520 for storing weights of an artificial neural network and of a convolution filter, an STFT converter 530, a feature extractor 540 and a classifier 550.

The STFT converter 530, the feature extractor 540, and the classifier 550 may operate under the control of the processor 510. In addition, although not shown in FIG. 10, when the ultrasonic receiver 20 continuously transmits a reflection signal, a data interface device (not shown) may be provided as described in FIG. 2. By doing so, the reflection signal may be received and properly transmitted to the STFT converter 530 or the feature extractor 540. That is, the data interface device may serve as a buffer in the process of transmitting the reflection signal to the STFT converter 530 or the feature extractor 540. The data interface device may also be composed of a chip or the like.

The feature extractor 540 extracts a 1D feature vector through a 1D convolution layer by inputting a signal derived from the reflection signal in the time domain. In this case, as an input signal for the convolutional layer of the feature extractor 540, a reflection signal in the time domain is used.

Alternatively, by further providing an STFT converter 530, the STFT converter 530 may divide the reflection signal in the time domain at predetermined time intervals, and perform Short-Time Fourier Transform on each the divided reflection signal. The time-frequency domain signal generated from such operation may be provided as an input signal to the convolutional layer of the feature extractor. When performing such convolution, a convolution filter is stored in the memory 520, and the feature extractor 540 reads the convolution filter of the memory 520 to perform convolution in the convolution layer. The memory 520 may be a volatile memory such as DRAM or SRAM. It may be stored in a nonvolatile memory (not shown) and loaded into the memory 520 when convolution is performed.

The classifier 550 receives such 1D feature vector as an input and estimates a probability value for each road surface type in a neural network having one or more layers.

The process of determining the classifier input signal through convolution of the feature extractor 540 and the process of estimating the road surface through the artificial neural network in the classifier 550 go through the same process as the flowchart of FIG. 3 or 7.

The classifier 550 configured as an electronic circuit chip may also determine a CNN model through machine learning for a neural network of one or more layers. The final classifier model is determined by learning the weight value using the training data in the artificial neural network having the same architecture.

As described above with reference to FIGS. 3 to 5, the feature extractor 540 and the classifier 550 are combined to form a convolutional neural network (CNN). The above-described weight may mean a weight of a connection value of one or more layers of the artificial neural network of the classifier 550 or a convolution filter value in a convolutional layer. As already described, the weight of the connection value of one or more layers of the artificial neural network of the classifier 550 can be determined through machine learning, and also the convolutional filter value in the convolutional layer of the feature extractor 540 can be determined through machine learning. In addition to the convolutional filter, the weight of the connection value of one or more layers of the artificial neural network may be uploaded from the nonvolatile memory (not shown) to the volatile memory 520. The classifier 550 reads the weight from the memory 520 and uses them for estimation of road surface type.

In this way, the model determined through machine learning is configured as hardware, that is, as an electronic circuit chip to form a feature extractor 540 and a classifier 550. The feature extractor 540 is formed of a chip including an electronic circuit implementing the function of the feature extractor 540 as described above, and the classifier 550 is formed of a chip including an electronic circuit implementing the function of the classifier 550 as described above. The feature extractor 540 and the classifier 550 may be configured as separate chips, respectively, or may be formed as a single chip including the feature extractor 540 and the classifier 550.

FIG. 11 shows a road surface type estimation test result at different sampling frequencies that can be adopted in the ultrasonic sensor system used to estimate the road surface type using an ultrasonic signal according to the present invention.

As described above, the ultrasonic sensor system includes an ultrasonic transmitter 10 and an ultrasonic receiver 20. Since the cost of the ultrasonic sensor system with a lower sampling frequency is cheaper, it is preferable to lower the sampling frequency within the limit of maintaining the performance required.

As shown in FIG. 11, at the sampling frequency of 1M Samples/sec, the accuracy of the road surface type estimation was 99.7% on average, at the sampling frequency of 40K Samples/sec, 99.6% on average, and at the sampling frequency of 20K Samples/sec, 99.4% on average. From these results, it can be determined that the sampling frequency that can be adopted in the ultrasonic sensor system used for estimating the road surface type using the ultrasonic signal according to the present invention is in a range of 20K Samples/sec-1M Samples/sec.

The road surface type estimation system based on ultrasonic signals employing the road surface type estimation apparatus 100 and 500 including an ultrasonic transmitter 10 and an ultrasonic receiver 20, described with reference to FIGS. 2 to 11, may be mounted on the a moving object such as a vehicle and road surface type information on which the moving object is running can be provided in real time, so that it can be used for operation control of the moving object. This can be of great help in smooth driving, especially when it is installed and used in an autonomous vehicle in the future.

What is claimed is:

1. A method for estimation road surface type using an ultrasonic signal, comprising:
(a) extracting a 1D feature vector through one or more 1D convolutional layers using an input signal derived from a reflection signal in the time domain of the ultrasonic signal reflected from the road surface after being emitted to the road surface;

(b) receiving the 1D feature vector as an input and estimating a probability value for each road surface type in an artificial neural network having one or more layers; and, (c) determining the road surface type from the estimated probability value for each road surface type.

2. The method according to claim 1, wherein the input signal of the one or more 1D convolutional layers in the step (a) is a signal in the time-frequency domain which is generated by dividing the reflection signal in the time domain at predetermined time intervals and performing Short-Time Fourier Transform on each divided reflection signal.

3. The method according to claim 1, wherein the input signal of the one or more 1D convolutional layers in step (a) is the reflection signal in the time domain.

4. The method according to claim 1, wherein the road surface type determined in step (c) includes at least one of asphalt, cement, dirt, ice, marble, applied paint, snow, water, and lanes marked on the road surface.

5. The method according to claim 1, further comprising a step of estimating a road surface friction coefficient from the road surface type determined in the step (c).

6. A road surface type estimation system using ultrasonic signals, comprising:
   an ultrasonic transmitter that emits ultrasonic waves on the road surface;
   an ultrasonic receiver for receiving a ultrasonic signal reflected from the road surface and generating a reflection signal; and
   a road surface type estimator using the reflection signal generated by the ultrasonic receiver, the road surface type estimator performing the method according to claim 1.

7. The system according to claim 6, wherein the road surface type includes at least one of asphalt, cement, dirt, ice, marble, applied paint, snow, water, and lanes marked on the road surface.

8. The system according to claim 6, wherein the sampling frequency of the ultrasonic transmitter and the ultrasonic receiver is in a range of 20K Samples/sec to 1M Samples/sec.

9. The system according to claim 6, wherein the ultrasonic transmitter, the ultrasonic receiver and the road surface type estimator are mounted on a moving body.

10. An apparatus for estimation road surface type using an ultrasonic signal, comprising:
    at least one processor; and,
    at least one memory storing computer-executable instructions,
    wherein the computer-executable instructions stored in said at least one memory, when executed by the at least one processor, causes the at least one processor to perform operations comprising:
    (a) extracting a 1D feature vector through one or more 1D convolutional layers using an input signal derived from a reflection signal in the time domain of the ultrasonic signal reflected from the road surface after being emitted to the road surface;
    (b) receiving the 1D feature vector as an input and estimating a probability value for each road surface type in an artificial neural network having one or more layers; and,
    (c) determining the road surface type from the estimated probability value for each road surface type.

11. The apparatus according to claim 10, wherein a road surface friction coefficient is estimated from the road surface type.

12. An apparatus for estimation road surface type using an ultrasonic signal, comprising:
    at least one processor;
    a memory for storing a convolution filter for convolution operation;
    a feature extractor for extracting a 1D feature vector through one or more 1D convolutional layers using an input signal derived from a reflection signal in the time domain of the ultrasonic signal reflected from the road surface after being emitted to the road surface; and
    a classifier that receives the 1D feature vector as an input and estimates a probability value for each road surface type in an artificial neural network having one or more layers.

13. The apparatus according to claim 12, further comprising:
    a Short-Time Fourier Transform converter that divides the reflection signal in the time domain at predetermined time intervals and performs Short-Time Fourier Transform on each divided reflection signal to generate a signal in the time-frequency domain, wherein the signal in the time-frequency domain is the input signal of the one or more 1D convolutional layers.

14. The apparatus according to claim 12, wherein the input signal of the one or more 1D convolutional layers of the feature extractor is the reflection signal in the time domain.

15. The apparatus according to claim 12, wherein the road surface type includes at least one of asphalt, cement, dirt, ice, marble, applied paint, snow, water, and lanes marked on the road surface.

* * * * *